United States Patent

[11] 3,587,041

| [72] | Inventor | Glenn T. Randol<br>P.O.Box 275, Mountain Lake Park, Md. 21550 |
|---|---|---|
| [21] | Appl. No | 750,888 |
| [22] | Filed | Aug. 7, 1968 |
| [45] | Patented | June 22, 1971 |

[54] WARNING SIGNAL SYSTEM FOR MASTER BRAKE CYLINDERS
7 Claims, 4 Drawing Figs.

[52] U.S. Cl. ................................................. 340/52, 200/82, 303/84
[51] Int. Cl. ........................................... G08b 21/00, B60q 9/00
[50] Field of Search ................................ 340/52, 242; 200/61.89, 82; 303/84 A

[56] References Cited
UNITED STATES PATENTS

| 2,046,316 | 7/1936 | Bentz | 340/242 |
| 3,404,246 | 10/1968 | Stimpson | 200/61.89 |
| 3,411,133 | 10/1968 | Gardner | 340/52 |
| 3,427,582 | 2/1969 | Brandon | 340/242 |
| 3,439,323 | 4/1969 | Kersting | 340/52 |

Primary Examiner—John W. Caldwell
Assistant Examiner—R. J. Mooney

ABSTRACT: An electric warning apparatus for hydraulic brake systems on motor vehicles and the like, actuatable by known forms of single or tandem dual-piston brake actuators, and having a single switch device controllably related with one piston only to monitor abnormal piston travel due to pressure loss from the operably related brake system.

WARNING SIGNAL SYSTEM FOR MASTER BRAKE CYLINDERS

The art is replete with various warning and detecting systems for indicating loss of brake-fluid but no consideration has been given an equally unsafe condition resulting from the fluid-displacement components nearing "bottom" with consequent loss of effective pedal to pressurize the fluid, such pedal loss may result from excessive lining wear and/or maladjustment due to inoperativeness of the self-adjusters and in no way related to fluid loss since both cylinders may be fully operative to pressurize the fluid under their respective fluid-displacement components (pistons).

The primary object of the invention is to provide a warning signal system which depends for its activation on a switch mechanically activated in response to a predetermined stroke of one of the dual pistons of a commercial tandem-type master cylinder to indicate brake-fluid and/or pedal loss upon either or both of said pistons reaching substantially the terminal portion of its normal pressurizing stroke, such loss resulting from leakage and/or wear or mechanical malfunctioning in the brake systems.

An object more specifically related to the primary object is to operatively associate such warning signal with either of the pistons comprising the commercial tandem-type dual master cylinder whereby the terminal portion of the normal pressurizing stroke of either piston is effective to activate said warning signal to apprise the driver of the malfunction of one or both of the brake systems.

Another object is to produce a warning signal for duplex hydraulic brake systems which becomes activated to warn the driver in response to insufficient fluid and/or abnormal pedal movement to produce pressurized displacement for brake operation.

Another object is to provide a warning signal which depends for its activation on mechanical interconnecting means with one of the dual pistons, and upon being activated will remain so until reset to inactivated position during servicing of the faulty brake system to restore it to normal operating condition.

A more specific object related to the commercial tandem-type dual piston master cylinder, is to controllably relate such warning signal with the primary piston directly actuatable by the pedal or associated booster unit, and wherein said primary piston monitors its own effectiveness and the effectiveness of the secondary piston to pressurize the fluid in their respective working chambers whereby loss of fluid from either of the working chambers or pedal loss at any point in the normal effectiveness of both pistons in a fluid-pressurizing direction is relayed to the primary piston which in turn activates the warning signal, that is, if pressure loss occurs in the secondary piston chamber a corresponding movement of the primary piston ensues automatically to enable the latter to pressurize the fluid in its related working chamber, and should the primary piston chamber fail a corresponding movement of the operably related piston occurs automatically to enable pressurization of the fluid in the working chamber of the secondary piston under said primary piston.

Another object related to the specific object next above is the provision of a switch having a contact element mechanically movable to close said switch under a switch actuator carried by said primary piston when said actuator and piston are moving normally as a unit in a fluid-pressurizing direction, said actuator being stabilized in switch operating position by a normally compressed spring reacting on said contact element to maintain said switch closed for sustaining said warning signal "on" during relative movement of said piston with respect to said actuator in pressure-inducing and releasing directions, said spring being effective upon restoration of said actuator to normal position, to open said switch thus turning said signal "off."

An object related to the object immediately preceding is to operably relate said switch actuator and element and said primary piston whereby the normal fluid-pressurizing stroke of the primary piston is not interrupted while the switch is closed, manual resetting of the switch actuator to normal position upon repairing the faulty brake system being required to enable the switch spring to open said switch.

Still another object of the invention is to utilize the warning signal in either single or dual-piston master cylinders without radically upsetting the normal construction thereof.

And a still further salient feature of the invention resides in the provision of a single energizable signal device which produces two readings on the conditions of the brake systems, that is, the operative status of the working chambers to pressurize the fluid for brake actuation or the inoperative status thereof whether one or both chambers.

Other objects, characteristic features and advantages of the invention will become apparent from the following detailed description of the drawing illustrating a presently preferred embodiment wherein:

FIG. 1 is a longitudinal-vertical section of a substantially commercial tandem-type dual master brake cylinder operably related with a warning signal system constituting the present invention and wherein the dual fluid-controlling components (pistons) are in their relaxed (released) positions corresponding to release of the schematically depicted service brakes, and the warning signal deenergized indicating that the overall hydraulic brake system is operative;

Figure 1:
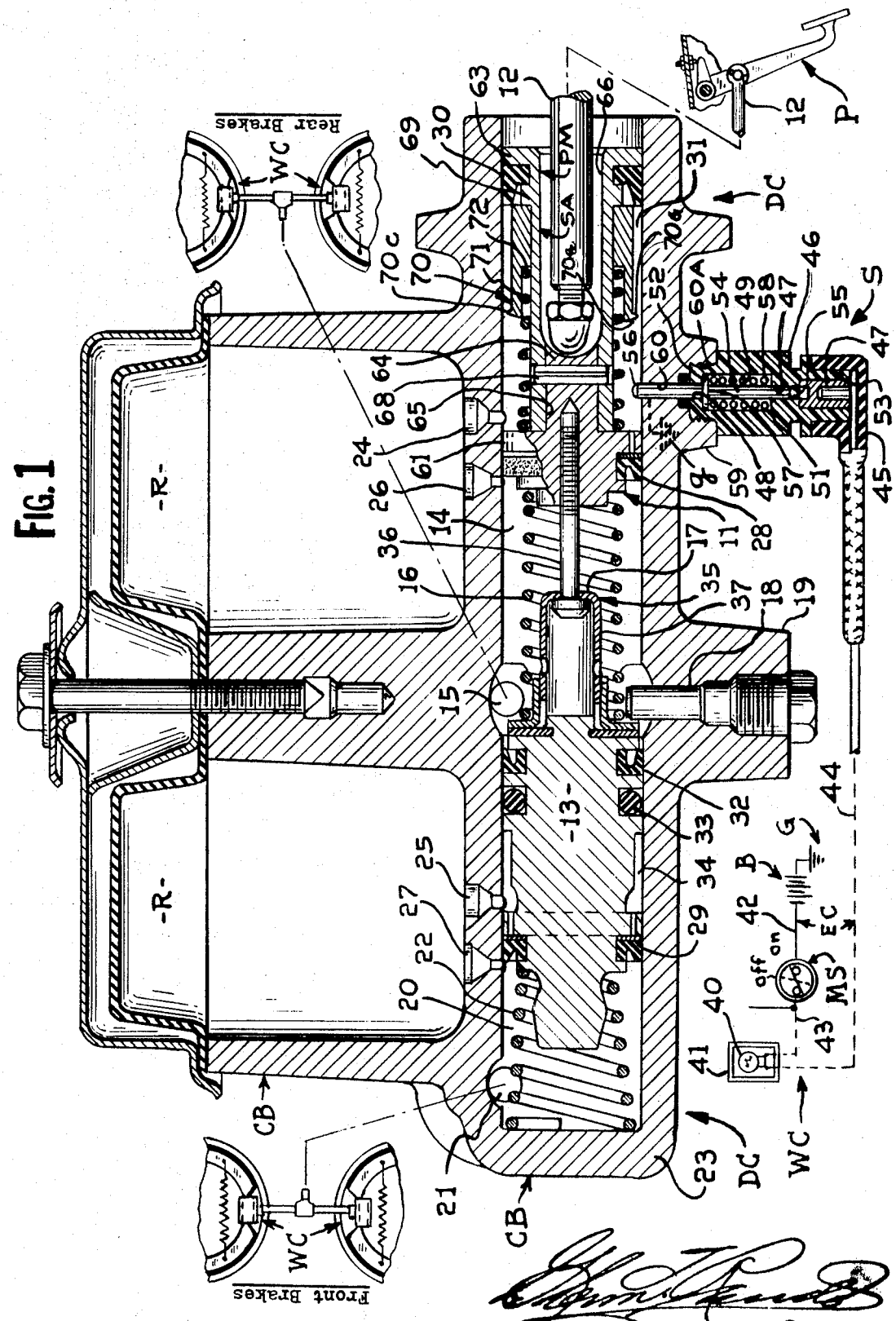

Referring to the drawing, I have used the reference character "DC" to designate the dual master cylinder as a whole which is illustrated herein as the commercial tandem-piston type in general use on most current model motor vehicles and the like, therefore, its structure and operation are well known thus requiring only sufficient description to establish the novel coaction thereof with the disclosed novel electric warning system generally designated "WS." The aforesaid so-called tandem-piston master cylinder DC is characterized by a chamber-defining body "CB" having a primary and a secondary section which function to split the overall brake system into two separate hydraulic systems.

The primary piston 11 is actuated by "operatable means (mechanism)" comprising a brake-pedal "P" and an interconnecting link (push-rod) 12, for example, or in installations which include a booster brake unit (not shown), the push-rod would take the form of a work-performing element under joint control of the booster unit and said operator-operated pedal P, the latter would in such case be effective on a separate push-rod to control the booster unit in a well known manner. The secondary piston 13 is characterized by "floating" compensating movement and is normally actuated in a fluid-pressurizing direction through a solid charge of confined fluid defining a pressure-working chamber 14 moving ahead of the primary piston 11 against the rear end of the secondary piston 13 as shown. The primary section includes the primary piston 11, operably related working chamber 14 having a pressure discharge passage 15 connected to one pair of service brakes, and a normally compressed spring 16 operably disposed in the working chamber 14 to react between the rear end 17 of the secondary piston 13 and confronting fluid-pressurizing end of said primary piston 11 to bias the latter toward normal position defined by the rear end 17 of the secondary piston 13 engaging a fixed stop element (pin) 18 projecting through a threaded boss 19 integral with the exterior of the cylinder body CB into the path of said rear end 17. The "floating" characteristic of the secondary piston 13 is effective to balance (equalize) pressurized displacement differences thus maintaining hydraulic pressure equalized in the overall brake system.

The secondary section include the secondary piston 13, operably related pressure-working chamber 20 having a pressure discharge passage 21 connected to the other pair of service brakes, and a normally compressed spring 22 operably disposed in the latter working chamber to react between the closed end 23 of chamber 20 and confronting pressure-displacing end of said secondary piston to bias the latter toward normal position defined by engagement with the aforesaid stop pin 18.

Fluid in the two-compartment reservoir "R" circulates between the working chambers 14, 20 and compartments of the two cylinder sections with each section having intake ports 24,25, respectively, positioned behind the pressure-displacing ends of said pistons and continuously open, and compensating ports 26,27, respectively, just ahead of said pistons in normal released positions. The pair of compensating ports 26,27 is closed as the piston cups 28,29, pass them thus creating a pressure buildup in the working chambers 14,20 therefore in the brake lines and connected pairs of wheel cylinders "WC," said piston cups being pressure-sealed and carried against the faces of the piston-heads on said pistons, respectively.

A fluid-retaining cup 30 is at the rear of the primary piston 11 to prevent fluid loss from the annular static fluid chamber 31 between the related piston-head and aforesaid cup 30, said latter chamber having continuous fluid communication with its reservoir compartment via said intake port 24. A pressure-retaining cup 32 is at the rear of the secondary piston 13 and in cooperation with the pressure-sealed cup 28 on the piston-head of the primary piston 11, seals the working chamber 14 between said pistons. An O-ring seal 33 is at the rear of the secondary piston 13 in forwardly spaced relation to the cup 32, and is spaced rearward of the piston-head carrying pressure-sealed cup 29 to define an annular static fluid chamber 34 having continuous communication with its reservoir compartment via said intake port 25.

A double-acting lost-motion mechanical connection 35 characterized by a pair of telescopically related elements 36,37 carried by said pistons 11,13, respectively, is operably disposed in the working chamber 14 between said pistons to transmit thrust therebetween upon engagement at opposite extremes wherein said lost-motion is fully taken up and thereby defining normal positions of said pistons 11,13 under their respective springs 16,22 at one extreme of engagement and enabling the primary piston 11 to actuate the secondary piston 13 to displace pressurized fluid under the latter pressurized displacement under said primary piston 11, said lost-motion being effective to accommodate relative actuation of the two pistons under normal "floating" compensating movement of the secondary piston 13 during equalized pressure actuation of both pairs of brakes, and also enabling said primary piston to bottom against the secondary piston upon pressure loss from the working chamber 14 to enable mechanical actuation of the secondary piston to effect pressurized displacement under said primary piston, the normal position of the latter piston when moving in a pressure-releasing direction under spring 16 being defined by the lost-motion in said connection 35 being fully taken up at said one extreme. Thus, the normal position of the secondary piston against the stop pin 18 defines the normal position of the primary piston under reaction from spring 16.

If a failure of the secondary section should occur, initial brake pedal movement is effective through the working chamber 14 to move the unrestricted secondary piston to "bottom" against the close end of the cylinder bore (working chamber 20), thus enabling movement of the primary piston to effect pressurized displacement from the working chamber 14 via its discharge passage 15 to actuate, for example, the front brake system. Should the primary section fail, initial brake pedal movement is effective to move the unrestricted primary piston to "bottom" against the secondary piston whereby continued movement of the brake pedal is effective to mechanically move the secondary piston to effect pressurized displacement from the working chamber 20 via its discharge passage 21 to actuate, for example, the rear brake system.

When one or the other of the sections fails, increased pedal travel and effort result from loss of one of the sections to compensate for the loss of the failed portion of the overall brake system, and this condition in itself provides a warning that a partial brake system failure has occurred.

Reference is now made to FIG. 1 wherein I have disclosed the aforesaid novel and improved warning or detecting signal system WS comprising an electric circuit "EC" having in series a battery "B" as the energizing source for said circuit, a manual master switch "MS" operable to "on" and "off" positions which may also serve as the engine ignition switch, a mechanically operated electrical switch "S," and an energizable signaling device disclosed herein as a warning light 40 mounted in a signal box 41 provided with a preferably transparent red in window conveniently located for the vehicle driver's observation on the instrument panel (dashboard). One side of the battery is grounded at "G" and a conductor 42 leads from the other side to one side of said manual switch MS, the other side of the latter switch having a conductor 43 leading to one side of the aforesaid warning light 40 with the other side thereof connected to one end of a conductor 44 provided at the other end with a tubular terminal 45.

The aforesaid switch S comprises an elongated body 46 preferably made of molded insulative material such as "Nylon" or "Teflon," and coextensive therewith are outer and inner coaxial bores 47,48, respectively, connected by an intermediate larger diameter bore 49 defining a switch chamber with the outer bore 47 terminating in a counterbore 50, said larger bore 49 defining a pair of spaced annular shoulders 51,52, respectively, as shown. Fixed in said counterbore 50 is a substantially coextensive tubular contact 53 in radially spaced relation to the wall defining said counterbore 50, said fixed contact 53 being connected to the terminal 45 of the conductor 44 as shown. An elongated contact element 54 is grounded at "9," and is movably disposed in said coaxial bores 47,48 in spanning relation to the larger bore 49 with opposite end thereof defining a conductive contact 55 and a working-head 56 and an intermediate outstanding flange 57 slidably positioned within said bore 49 in normal engagement with said shoulder 52. A normally compressed spring 58 is operably disposed in the bore 49 in encircling relation to the spanning portion of the contact element 54 to react between the shoulder 51 and said flange 57 and thereby biasing the latter into engagement with the shoulder 52 and the contact 55 away from the fixed contact 53 to open the switch S with resultant deenergization of the circuit EC and warning light 40 as shown in FIG. 1.

A boss 59 projects from the exterior of the wall defining the primary section. A bore 60 merges with a threaded counterbore 60a, and located behind a detachable piston-head 61 on the primary piston 11. A complementally threaded stem 62 extends from the inner end of said switch body and through which said bore 48 passes, and threadingly engages the counterbore 60a to rigidly mount the switch S on the cylinder body CB in operating position with respect to a tubular switch actuator designated "SA" carried on an elongated reduced diameter piston-carrying member (segment) "PM" interconnecting the piston-head 61 with an annular outstanding grooved piston (flange) 63 fitted with the said fluid-retaining cup 30, said piston-head being provided with a rearward extending reduced cylindrical stem 64 pressfitted into an axial bore 65 communicating with an elongated socket 66 formed in said extension PM, said socket being adapted to receive said push-rod 12 into engagement with the end of the stem 64 to operate the primary piston 11 in a fluid-pressurizing direction. A cross bore 67 fitted with a split expansible pin 68 connects the extension PM and stem 64 as a safeguard against fortuitous separation thereof.

Figure 4:
FIG. 4 illustrates the switch-actuating portion of the switch actuator flanged element on an enlarged scale in readiness to close the warning switch.

The switch actuator SA is slidably mounted on the segment PM for the latter therefore the primary piston 11, to have unitary and relative movements with respect to said actuator SA to close the switch S and hold it closed, respectively, until the overall brake system is again made operative and the switch S opened. The rear end of said actuator SA is normally in engagement with an annular abutment (stop) 69 on said member PM in spaced relation to the aforesaid cup 30, and the forward end defines a switch-actuating portion disclosed herein as an annular outstanding flange 70 in V-shaped cross section having a wide switch-actuating portion (face) 70a and a narrow abutment portion (face) 70b diverging from a common vertex 70c, said faces having operating camming engagement with the aforesaid working-head 56 to move the contact element 54 therefore conductive contact 55 into engagement with said fixed contact 53 to close the switch S in opposition to spring 58, and to block return of said actuator SA to normal position upon closure of said switch thus maintaining the latter closed until the actuator SA is manually released to enable spring 58 to open said switch, respectively. The switch-closing face 70a is normally spaced from the switch working-head 56 defining the inner end portion of the contact element 54, and normally projects into the path of said face 70a (see FIG. 4) for actuation thereby upon movement of said primary piston 11 through substantially the initial half of its full operating stroke, said initial half of movement corresponding substantially to the full pressurizing stroke of the secondary piston. Engagement of said switch-closing face 70a with said switch working-head 56 forces the latter to ride up said face 70a thus moving the contact element 54 upwardly in opposition to spring 58 to effect engagement of the contact portion 55 with the tubular fixed contact 53 to close the switch S (see FIG. 2) with resultant completion of the circuit EC and energization of the warning light 40. As the actuator SA continues to move forwardly upon closing the switch S, the working-head 56 rides over the vertex 70c then down the narrow abutment face 70b which may be normal to the axis of said actuator rather than angular as shown, into engagement with the normal outer diameter of the actuator SA without opening the switch S under spring 58 and thereby releasably stabilizing the switch S in closed position to maintain the light 40 "on" until the actuator SA is manually released to normal position shown in FIG. 1 wherein the rear end of said actuator SA engages the abutment 69 under a normally compressed spring 71 encircling the forward portion of said member PM to react between the rear face of the piston-head 61 and an annular shoulder 72 defining the juncture of a counterbore 73 and normal inner diameter of said actuator SA. It is important to note that manual unthreading of the switch body 46 is effective to withdraw the working-head 56 clear of the abutment face 70b which releases the spring 71 to reset the actuator SA into its normal position with respect to the segment PM.

Figure 2:
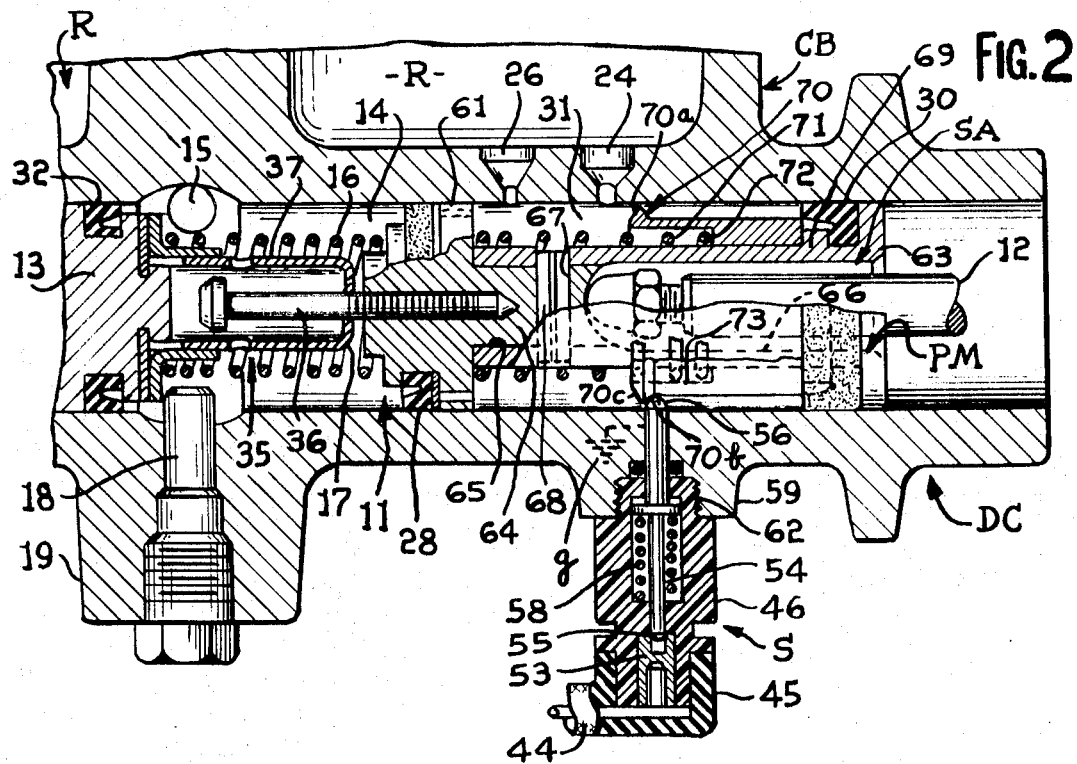
FIG. 2 is a fragmentary enlargement of FIG. 1 showing an operated status of the master cylinder wherein the warning signal is energized to indicate loss of pressurized displacement from one or the other of the cylinder sections or that the fluid-displacement components (pistons) are about to "bottom" out.
Figure 3:
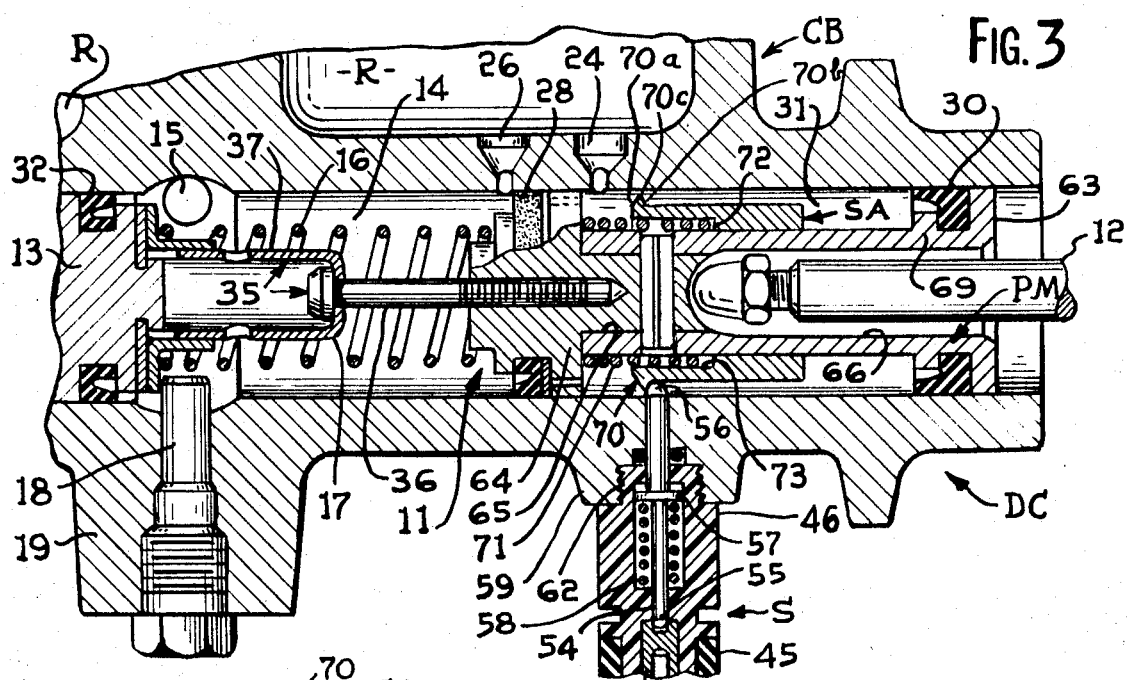
FIG. 3 is a view similar to and on the same scale as FIG. 2 but showing a different operated status wherein the warning signal remains energized notwithstanding the dual fluid-displacement components (pistons) are fully released.

The aforesaid releasable stabilization of the contact element 54 in closed-contact position as shown in FIG. 2 is a function of the spring 58 reacting through said element 54 to produce a resistance opposing spring 71 of sufficient differential to prohibit the latter spring from resetting the actuator SA to normal position shown in FIG. 1 and turning the signal light 40 "off," such resistance being a factor of the narrow abutment face 70a reacting on the working-head 56 whereby the latter cannot be forced to ride up said face 70b under said actuator spring 71 thus limiting return movement of said actuator SA short of normal position as shown in FIG. 3.

It is thus seen that upon the actuator SA moving the contact element 54 to close the switch S and ensuing partial release thereof under spring 58 into engagement with the normal outer diameter of said actuator SA on the right side of the face 70b, that irrespective of subsequent stroking of the primary piston 11 to actuate, for example, the secondary piston 13, the switch S will remain closed thus maintaining the signal light 40 "on" since the rear face of the piston-head 61 is so spaced normally from the actuating face 70a that it never engages the confronting end of the latter face, manual resetting being required to place the actuator SA in normal switch-open position shown in FIG. 1 after a brake system fails or when the pistons 11,13 are about to bottom out, wherein the electric circuit EC is deenergized and the signal light 40 turned "off."

In the FIG. 2 depiction of the invention, the primary piston 11 has moved substantially through three-fourths of its initial half of the full operating stroke thereof as a result of loss of pressurized displacement from the working chamber 14. Continued movement of this piston automatically effects engagement with the rear end 17 of the secondary piston 13 as a function of the lost-motion connection 35 thus enabling the latter piston to pressurize the fluid in its related working chamber 20 and actuate the connected pair of service brakes as shown. Under such conditions, the primary piston 11 is free to reciprocate through its full operating cycle which is substantially twice that of the secondary piston 13, under pedal P and opposing spring 16, such reciprocable movement being ineffective to return the actuator SA to normal switch-open position under spring 71 with respect to the primary piston 11 since the magnitude of resistance between the abutment face 70b and cooperating left side of the working-head 56 is greater than the compressive deflection of spring 71. During the terminal half of the full operating stroke of the primary piston, the abutment 69 is disposed in engagement with the confronting rear end of the actuator SA to move as a unit in a fluid-pressurizing direction thus advancing the faces 70a, 70b relatively to the working-head 56 while the latter rides the normal outer diameter of the actuator SA to maintain the switch S closed. Upon retracting the primary piston 11 to normal position as shown in FIGS. 1 and 3, the abutment face 70b is returned to its abutting relationship with respect to the working-head 56 under spring 71 as shown in FIG. 3, as a unit with the primary piston 11 and the latter continuing to move toward its normal position relatively to the actuator SA stabilized in switch-closed position under releasable blocking by said face 70b against said working-head 56.

Accordingly, should the primary piston 11 be fully stroked in a fluid-pressurizing direction, the actuator SA would move as a unit therewith due to the abutment 69 being in engagement with the rear (right) end of said actuator SA; but in retracting the latter piston in a pressure-releasing direction toward normal position, the actuator SA moves initially under spring 71 as a unit with said primary piston 11 in engagement with said abutment 69 until the abutment face 70b comes into contact with the left side of the working-head 56 and thereafter the primary piston moves relatively to the actuator SA toward normal position with the latter disengaged from the abutment 69 accommodated by yielding of the spring 71 (see FIG. 3).

To reset the actuator SA to normal position, the switch S must be first withdrawn by partially unthreading the stem 62 from the counterbore 60a sufficiently to retract the working-head 56 free of the abutment face 70b which operation is effective to release the actuator SA under spring 71 to move to the right relatively to the segment PM into engagement with the abutment 69 in readiness for another switch-closing operation to turn the signal light 40 "on" should either section of the overall brake system fail to produce pressurized displacement for brake actuation or that the pistons 11,13 are nearing "bottom."

The normal spacing between the camming face 70a and working-head 56 on the contact element 54 is adjusted to enable a switch-closing operation upon either piston 11 or 13 completing substantially three-fourths of their normal pressurizing stroke as defined by substantially the initial half of the full stroke of the primary piston 11. The remaining half of the pressurizing stroke of the latter piston being utilized for brake actuation should the secondary piston 13 fail, and should the primary piston 11 fail such remaining half of the pressurizing stroke would be utilized to mechanically actuate the secondary piston 13 through the engaged lost-motion connection 35, and when both pistons 11,13 near "bottom," a switch-closing operation occurs to provide a warning signal as explained above.

Accordingly, the initial half stroke substantially of the primary piston 11 utilizes its terminal portion to activate the warning signal 40 to read pressure loss from either of the master cylinder sections of the overall brake system or that the pistons 11,13 are about to "bottom" out for a fuller and more comprehensive safety control in operating automotive hydraulic brake systems over that provided by signalling pressure loss alone.

Operation of my novel warning signal system WS may be summarized as follows:

With the parts in relative positions shown in FIG. 1, the fluid-displacement pistons 11,13 are in normal positions and their operably related pressure-working chambers filled with fluid at atmospheric pressure corresponding to that contained in their respective reservoir compartments via the open compensating ports 26,27. The switch actuator SA is in fully retracted position against the abutment 69 under influence of its spring 71 and the switch S open due to the spring 58 biasing the flange 57 on the contact element 54 into engagement with the aforesaid shoulder 48 thus presenting the working-head 56 in actuating position with respect to the camming face 70a on the actuator SA.

Under these conditions, the two pistons 11,13 may be normally stroked in unison through substantially the initial half of the stroke of the primary piston 11 to effect pressurized buildup in both of the master cylinder sections for actuating the two pairs of vehicle service brakes, respectively. Should one of the sections fail, for example, the primary section which includes piston 11, then the latter piston would move unrestrictedly through substantially its initial half of its full stroke to actuate the switch S to closed position (see FIG. 2) thus completing the circuit EC with resultant turning "on" of the signal light 40 and rendering the lost-motion connection 35 effective to enable unitary movement of the pistons 11,13 through the remaining half of such operating stroke for the secondary piston 13 to effect pressurized displacement from its related working chamber 20 into its connected pair of vehicle service brakes to control the vehicle even though the other pair of service brakes is ineffective to brake the vehicle as shown in FIG. 2. Also note that the working-head 56 of the switch S is now on the right side of the abutment face 70b and will remain so irrespective of the extent of stroking the primary piston (see FIG. 3) to actuate the related pair of vehicle brakes or the other pair of brakes actuated by the secondary piston 13 depending on which of the master cylinder sections has failed.

Should the secondary section fail, then the secondary piston 13 would bottom and the lost-motion connection 35 would function to enable relative pressurizing displacement under said primary piston 11 to actuate the connected pair of vehicle brakes. Bottoming of the secondary piston 13 would cause the primary piston 11 to move unrestrictedly through substantially its initial half of its normal pressurizing stroke along with unrestricted movement of the secondary piston to "bottom" position, before the primary piston 11 would be operative to effect pressurized displacement from its related working chamber 14, the last half of such pressurizing stroke being accommodated by the lost-motion connection 35 operating between its said engaging extremes to bring about pressurization of the fluid in said working chamber 14 to actuate the connected pair of vehicle brakes.

Since the relative disposition of the actuating face 70a with respect to the working-head 56 on the contact element 54 is preferably established for the primary piston 11 to move through substantially three-fourths of its initial half of its full pressurizing stroke before switch actuation occurs to close the switch S, it follows that the present novel warning signal system WS includes the highly important safety feature of signalling the driver automatically when the two pistons 11,13 are about to "bottom" out with consequent loss of effective pedal. The two master cylinder sections may be fully operative insofar as being capable of creating pressurized displacement for brake actuation but with loss of pedal due to excessive lining wear, maladjusted brakes or mechanical malfunctioning for example, even a temporary leakby permitted by one of the cups in the overall brake system could result in lowering the pedal to the floorboard without forewarning the pedal was nearing "bottom" thus negating operation of the master cylinder DC with resultant total loss of braking power, and upon the next stroke of the brake pedal such cup failure may not occur thus providing a degree of braking power. The invention contemplates driver awareness of an unsafe condition in the overall brake system whether such condition results from the pistons 11,13 nearing "bottom" or from pressure loss from one or both of the master cylinder sections. The safety standard for any automotive hydraulic brake system is greatly enhanced by providing a warning signal as the pistons approach "bottom" to anticipate a pressure loss rather than a conventional signal which becomes effective upon actual pressure loss from one or both of the master cylinder sections. The invention further contemplates that the signal device may be in the form of an electric light or a buzzer, and that the electric circuit EC may be independent of the master switch MS so that turning "off" this switch will not interrupt the signal indicating a fault in the overall brake system, such modified hookup of the circuit EC for the light 40 would require, upon correcting the faulty section, that the switch S be placed in open circuit-interrupting position by manually resetting the actuator SA to normal position shown in FIG. 1 wherein the light 40 is turned "off" as previously described. The actuator SA in normal position moves unitarily with said primary piston 11 through substantially half of the full operating stroke of the latter without operating the switch S to closed circuit-completing position but substantially at such midway point, said actuator becomes effective to operate said switch to closed position and so maintain it thereafter through the full operating stroke of the primary piston 11 until the actuator is manually reset to its normal position aforesaid wherein unitary movement with said primary piston 11 is effective and said switch disposed in open circuit-interrupting position.

The novel feature of the present invention which enables energization of the signal 40 under mechanical actuation of one of the fluid-displacement pistons 11,13 as in the case of a dual master brake cylinder or the piston of a single-piston master cylinder, produces the combined signal effect for both loss of pressure or piston stroke.

It is obvious from the disclosure, that the present invention may be located remotely of the master cylinder unit DC since an element of the aforesaid "operatable means or mechanism" therefor which includes, for example, the force-transmitting input element (push-rod) 12 and pedal P, may be employed as the carrier of the switch actuator SA for the switch S which would be mounted in operating position with respect to said actuator on a fixed portion of the vehicle rather than be embodied in the master cylinder body CB as shown in FIG. 1. Accordingly, the invention contemplates such remote installation of the actuator and switch so that this safety product may be sold as an aftermarket accessory without involving any structural changes in the commercial tandem master cylinder. This special feature of the invention results from the mechanical unitary movement of the operatable means and the primary piston 11, and therefore, any element acted on by the pedal and even the pedal itself, may be employed as the carrier of the novel switch actuator SA for controlling the warning switch S in the manner described.

From the detailed disclosure above considered with the drawing, it should be manifest that the objects enumerated as well as other advantages and safety benefits have been achieved, by producing a simple and effective electric warning system for master brake cylinders of the character under consideration, easily and economically incorporated in commercial master cylinders or remotely thereof and which utilizes a commercial warning switch.

It is to be understood that I do not wish to limit my invention to the above described novel association and coaction of the elements and details because it would be readily apparent to persons skilled in the related art that other modifications, substitutions and/or arrangements could be resorted to without departing from the terms of the subjoined claims.

Having thus described my invention, I claim:

1. In combination with a master cylinder utilizable for actuating a hydraulic brake system on motor vehicles and the like, and characterized by a fluid-displacement piston reciprocably disposed in said cylinder to produce pressurized fluid displacement therefrom, a normally compressed spring continuously reacting on said piston to bias it toward normal position, operatable means including an operator-operated member for actuating said piston in a fluid-pressurizing direction in opposition to said spring, a piston-head defining the pressurizing end of said piston, a fluid-retaining head defining the nonpressurizing end of said piston and longitudinally spaced from said piston-head, and a piston-carrying segment defining an annular fluid space between said piston and retaining heads and adapted to interconnect said heads for unitary movement; a switch actuator comprising an elongated cylindrically walled sleeve concentrically mounted on said piston-carrying segment for relative sliding and unitary movements with respect to said piston and normally spaced from said piston-head adjacently with respect to said retaining-head; an abutment element on said piston-carrying segment engageable by one end of said actuator sleeve for defining the normal position of the latter and enabling unitary movement with said piston in a fluid-pressurizing direction; an angular switch-actuating portion defining the other end of said actuator sleeve; an abutment portion at the other end of said actuator sleeve in spaced relation with respect to said switch-actuating portion and of less working effectiveness than the latter; a normally compressed spring operably incorporated between said piston-head and a portion adjacent the one end of said actuator sleeve for biasing the latter toward normal position aforesaid; an electric circuit including in series a source of electrical energy having a ground, an energizable signalling device, a mechanically operated electric switch having a body made of insulative material and formed with a switch chamber, a movable element in said switch chamber having a conductive grounded contact at one end and a working-head defining the other end, another conductive contact fixed at one end of switch chamber for engagement by said grounded contact to close said switch with consequent energization of said signalling device upon said switch-actuating portion operably engaging said working-head as a function of unitary movement of said actuator sleeve and piston in a fluid-pressurizing direction to indicate that the latter is nearing "bottom" and/or loss of pressurizing displacement thereunder; a normally compressed spring in said switch chamber reacting on said grounded element to bias said grounded contact out of engagement with said fixed contact, and said working-head into cooperating position with respect to said switch-actuating portion on said actuator sleeve, to open said switch thus interrupting said circuit and deenergizing said signalling device upon said actuator sleeve returning to normal position on said piston under said second-defined spring, said abutment portion on said actuator sleeve being effective to block return of said actuator sleeve under said second-defined spring to normal position by engaging the working-head aforesaid upon the switch-actuating portion engaging the latter to close said switch as aforesaid thus maintaining said switch closed irrespective of the extent of subsequent stroking of said piston in fluid-releasing and pressurizing directions.

2. A combination as claimed in claim 1 in which said piston-head is detachably mounted on said piston-carrying segment to enable assembly of said actuator sleeve thereon.

3. A combination as claimed in claim 2 in which said switch-actuating portion is an annular angular shoulder effective to impart camming-action on the working-head aforesaid to move the grounded conductive contact into engagement with said fixed contact to close said switch in opposition to the third-defined spring aforesaid reacting on said grounded element.

4. A combination as claimed in claim 3 in which said switch abutment portion is an annular shoulder adapted to partially release said working-head under said third-defined spring short of opening said switch, into riding-contact with said actuator sleeve proper defining the inner periphery of said abutment shoulder, and thereby releasably blocking said actuator sleeve from moving toward normal position aforesaid under said second-defined spring to maintain said signal device energized until said actuator sleeve is manually released at will to return to said normal position.

5. An electrical signalling system for a master cylinder utilizable for actuating a hydraulic brake system on motor vehicles and the like, said cylinder having a pressure-working chamber, and actuating means including a piston reciprocably related with said chamber to pressurize the fluid therein to actuate said brake system, the improvement which comprises: an electric circuit including in series a source of electrical energy having a ground, an energizable signalling device, and an electric switch having an element mechanically operable into engagement with and disengagement from a fixed contact to closed position and spring-biased to open position to complete and interrupt, respectively, said circuit; switch-controlling means operably related with said actuating means enabling the latter to have unitary and relative movements with respect to the former; spring means including a normally compressed spring continuously reacting between said controlling and a portion of said actuating means to establish the former in normal position with respect to the latter for unitary movement; and a switch-actuating element having an actuating portion and a stabilizing portion carried by said controlling means, said actuating portion being effective to actuate said switch element to closed position against said spring-bias effective to complete said circuit and energize said signal device to monitor abnormal travel of said actuating means at the terminal portion of the normal working stroke of said piston as a function of said unitary movement of said actuating and controlling means in a fluid-pressurizing direction, said stabilizing portion being effective to abut said switch element upon said actuating portion closing said switch as aforesaid, enabling said switch element to move into riding-contact with said controlling means proper to present said switch element in abutting relationship with respect to said stabilizing portion, and thereby accommodating relative movement aforesaid of said actuating means accompanied by yielding of said spring means to releasably maintain said switch closed and said signal device energized irrespective of the cycling of said actuating means through such abnormal travel relatively to said controlling means.

6. A signal system as claimed in claim 5 in which one of said mechanical components operatively embodied in said electric circuit is provided with a grounded connection, according to the order of interposition in said circuit with respect to said source of electrical energy.

7. A signal system as claimed in claim 6 including another piston reciprocably related with said chamber in tandem coaxial relationship ahead of said first-defined piston to divide said chamber to provide a working chamber for the other piston enabling actuation of a duplex brake system, and a lost-motion mechanical connection operably disposed in the working chamber for the first-defined piston between said pistons, effective in one direction for the first-defined piston to mechanically actuate the other piston in a fluid-pressurizing direction upon abnormal travel of the first-defined piston due to loss of pressurized displacement thereunder, and for the first-defined piston to actuate in a fluid-pressurizing direction upon abnormal travel of the other piston due to loss or pressurized displacement thereunder, whereby said signal device when energized as aforesaid is effective to monitor abnormal travel of the other piston or both pistons.